United States Patent [19]

Savin

[11] Patent Number: 5,167,701
[45] Date of Patent: Dec. 1, 1992

[54] ZINC-RICH COATING COMPOSITION WITH INORGANIC BINDER

[76] Inventor: Ronald R. Savin, 11001 Muirfield Dr., Rancho Mirage, Calif. 92270

[21] Appl. No.: 887,547

[22] Filed: May 22, 1992

[51] Int. Cl.$^5$ ................................................. C09D 5/10
[52] U.S. Cl. .............................. 106/14.41; 106/14.44; 252/396
[58] Field of Search ..................... 106/14.41, 14.44; 252/396

[56] References Cited

U.S. PATENT DOCUMENTS

| | | | |
|---|---|---|---|
| 3,859,101 | 1/1975 | Slater | 106/14.41 |
| 4,417,007 | 11/1983 | Salensky et al. | 523/442 |
| 4,891,394 | 1/1990 | Savin | 523/442 |
| 5,098,938 | 3/1992 | Savin | 523/442 |

FOREIGN PATENT DOCUMENTS 2602239 2/1988 France.

OTHER PUBLICATIONS

Akzo N.V. Brochure, Untitled—No author; pp. 1-9.

*Primary Examiner*—Karl Group
*Assistant Examiner*—Anthony J. Green
*Attorney, Agent, or Firm*—Frost & Jacobs

[57] ABSTRACT

A one-package zinc-rich coating composition having an inorganic binder which provides protection of metallic substrates against environmental attack comprises, in volume percent:

from about 55% to about 60% of an alkyl silicate solution having a solids content of about 35% to about 45% by weight; about 10% to about 14% zinc dust of at least one different particle size grade; about 0.5% to about 2.5% zinc flakes; about 3% to about 6% particulate ferrophosphate; about 10% to about 17% of a particulate crystalline silica having an oil absorption value of less than 20 measured by ASTM Test D 281-84; about 1% to about 2.5% of at least two different size grades of pyrogenic amorphous silicas having average particle sizes ranging from about 0.007 to about 0.04 micron; about 0.3% to about 0.5% of a wetting agent; and about 7% to about 8% of an anhydrous alcohol solvent.

14 Claims, No Drawings

ZINC-RICH COATING COMPOSITION WITH INORGANIC BINDER

BACKGROUND OF THE INVENTION

1. Field of the Invention

This invention relates to a coating composition which provides improved resistance to environmental attack of metallic substrates and markedly higher "throw" (as hereinafter defined), and which can be applied by any conventional coating technique. The coatings deposited by the composition of the invention may be electrically non-conductive but are nevertheless highly cathodic when applied over a ferrous metal substrate, and can be recoated with any topcoat at any time.

2. Description of the Prior Art

Zinc-rich primers having an inorganic binder or vehicle have been in use for about 40 years. Typically such compositions contain about 80% to about 95% by weight powdered zinc, and alkyl silicate has been the inorganic binder of choice. Single-package primer compositions containing about 80% to about 90% by weight zinc and ethyl silicate binder have been in use for about the last 20 years.

A brochure published by AKZO N.V. (publication date unknown) discusses the development of zinc-rich primers, the preparation of ethyl silicate and its use and mechanism as a binder. This publication explains that ethyl silicate is derived from tetraethyl orthosilicate which is reacted with water in the presence of an organic solvent to produce liquid polysiloxane resins. When used in a zinc-rich primer, evaporation of the solvent after application of the coating results in transformation of the polysiloxane resin to amorphous silica, which becomes the bonding film in the cured coating. The amorphous silica reacts chemically with some of the zinc powder in the coating to form zinc silicate compounds. The silica will also react with the ferrous metal substrate, particularly if it is previously abraded or sandblasted, to form iron-(zinc)-silicate bonds. Silicate mineral extenders frequently used in zinc-rich primers also are believed to react chemically in such inorganic systems. The resulting bonding matrix allows a controlled galvanic current flow between the ferrous substrate and the zinc pigment (cathodic and anodic to one another, respectively), thus providing long term galvanic protection, including scratched or abraded bare areas of substrate due to adjacent zinc metal.

U.S. Pat. No. 4,417,007, issued Nov. 22, 1983, to Salensky et al., discloses a zinc-rich paint formulation containing manganomanganic oxide as a color pigment, in which the binder may be any one of (1) epoxy resins, (2) that derived by reaction from diglycidyl ether of bisphenol A and vegetable oil fatty acids, (3) that derived from bisphenol A and epichlorohydrin, or (4) alkyl silicate. From about 43% to 90% by weight zinc dust, and from about 3% to 38% manganomanganic oxide are present, along with from about 4% to 25% by weight epoxy resin binder, 0 to about 35% by weight pigment extenders and binders, 0 to about 5% by weight of a pigment suspension agent and balance solvent, in a claimed embodiment.

U.S. Pat. No. 4,891,394, issued January, 1990 to R. R. Savin, discloses a coating composition comprising about 10% to about 25% by weight of a film-forming polymer which may be an epoxy resin, a vinyl chloride resin copolymerized with polyisocyanates, or a vinyl chloride resin copolymerized with melamines; about 30% to about 60% by weight particulate metallic zinc; a crystalline silica having an oil absorption value of less than 20 measured by ASTM Test D281-84, the volumetric ratio of such silica to zinc ranging from about 0.7:1 to about 1.25:1; about 2% to about 3% by weight of a pyrogenic amorphous silica having an average particle size less than about 0.012 micron (for control of rheological characteristics); and at least one solvent for the film-forming polymer.

French Patent 8611238 (Publication No. 2,602,239), published February, 1988, in the name of R. R. Savin, discloses a two part coating composition containing up to 70% by weight of a powdered metal (based on the total weight after admixture); about 2% to 30% by weight of a film-forming polymer (as an organic binder); about 2% to about 30% of a hardener for the polymer; at least 1.8% and up to 30% of an agent for control of rheological characteristics; and up to 30% organic solvents. A preferred polymer is an epoxy resin having an average molecular weight of 350 to 3800. The agent for control of rheological characteristics includes at least one pyrogenic silica and optionally at least one natural or transformation silica having an oil absorption value preferably not greater than 90 and more preferably not greater than 40.

U.S. Pat. No. 5,098,938, issued March, 1992 to R. R. Savin, discloses a coating composition similar to that of the above-mentioned U.S. Pat. No. 4,891,394, wherein an epoxy resin film-forming binder is used, and wherein at least four different size grades of pyrogenic amorphous silicas are present within specified proportions and average particle sizes, together with a crystalline silica having an oil absorption value of less than 20 measured by ASTM Test D281-84.

Conventional zinc-rich primers having an inorganic binder exhibit the following disadvantages:

Sedimentation or settling requires continuous agitation before and during application.

Recoatability of inorganic binder primers is poor.

Sandblasting or abrading of the metallic substrate is needed for best results.

Application by brushing or flowcoating is not recommended for inorganic binder primers.

The density of the composition is high due to the high metallic zinc content.

Prior art zinc-rich primers having organic binder suffer from the following disadvantages:

Prolonged exposure to acetone, methylene chloride and/or methylethylketone will cause eventual deterioration of the coating.

Heat resistance is relatively low, i.e., loss of properties when subjected to temperatures above 175° C. (350° F.) and destruction of the coating when subjected to temperatures above about 260° C. (500° F.).

The "throw" properties are poor as measured by the so-called bullet test, which determines the distance and/or area of cathodic action around a bare area of substrate.

While progressive improvements in general resistance to environmental attack of metallic substrates are disclosed in the prior art acknowledged above, there is nevertheless a genuine need for a one-package zinc-rich coating composition which avoids all the disadvantages pointed out above inherent in both inorganic and organic binder zinc-rich compositions.

SUMMARY OF THE INVENTION

It is an object of the present invention to provide a one-package coating composition which meets the above needs by overcoming the combined disadvantages of both inorganic and organic binder compositions in a cost effective manner.

While not so limited, the coating composition of this invention has particular utility in the protection of large steel structures such as bridges, ships, storage tanks, highway guardrails, reinforcing bars for concrete, and the like. In addition, the composition of the invention may be used in moving line applications such as undercoating for automotive body parts, and as a replacement for galvanizing.

According to the invention there is provided a one-package coating composition for the protection of metallic substrates against environmental attack comprising, in volume percent based on the total volume of the composition:

- from about 55% to about 60% of an alkyl silicate having a solids content of about 35% to about 45% by weight;
- about 10% to about 14% zinc dust of at least one different average particle size grade;
- about 0.5% to about 2.5% zinc flakes;
- about 3% to about 6% particulate ferrophosphate;
- about 10% to about 17% of a particulate crystalline silica having an oil absorption value of less than 20 measured by ASTM Test D 281-84;
- about 1% to about 2.5% of at least two different size grades of pyrogenic amorphous silicas having average particle sizes ranging from about 0.007 to about 0.04 micron;
- about 0.3% to about 0.5% of a wetting agent; and
- about 7% to about 8% of an anhydrous alcohol solvent.

Preferably the alkyl silicate solution is ethyl silicate in ethanol as a solvent. Other anhydrous alcohols may also be used as a solvent. Since storage stability or shelf life is dependent upon a substantially anhydrous composition, the ethanol solvent should be so-called absolute alcohol, which contains less than 0.1% water.

For an electrically non-conductive coating, the zinc flakes required in the composition of the invention should be within the lower half of the range set forth above since the zinc flakes are highly conductive. The metals present as a group in this embodiment of the invention, including ferrophosphate, preferably range from about 17% to about 18% by volume. An electrically non-conductive coating is desirable in metal structures which are grounded since it decreases depletion of the zinc in the coating.

DETAILED DESCRIPTION OF THE INVENTION

In the preferred practice of the invention, the composition comprises about 55% to about 60% ethyl silicate in substantially anhydrous ethyl alcohol (ethanol) having a solids content of about 40% by weight; equal volumes (totaling about 10% to about 12) of two different particle size grades of zinc dust having an average particle size of about 4 microns and an average particle size of about 6 microns, respectively; about 0.8% to about 2.0% zinc flakes having an average width of about 0.9 micron and an average length of about 10 microns; about 5% to about 6% particulate ferrophosphate having an average particle size of about 10 microns; about 11% to about 15% crystalline silica, which may be silane treated, having the oil absorption value specified above and an average particle size of about 2 microns; about 1% to about 2% in total of three different size grades of pyrogenic amorphous silicas, which may be silane treated, having average particle sizes of about 0.007 micron, about 0.008 micron and about 0.018 micron, respectively; about 0.3% to about 0.5% of a nonionic wetting agent; and about 7% to about 8% anhydrous n-butanol as a solvent.

Optionally the composition may also contain up to about 0.3% by volume zeolite molecular sieves, e.g., of a type obtainable from Union Carbide.

Since the presence of water in the composition will cause the product to gel in storage, the solvents which are used should be substantially anhydrous, and the pigments should be dried prior to mixing. For best results, mixing and packaging should be carried out under a nitrogen atmosphere in order to exclude water vapor present in air.

The presence of crystalline silica having an oil absorption value less than 20 measured by ASTM Test D281-84, in combination with at least two different size grades of pyrogenic amorphous silicas having average particle sizes ranging from about 0.007 to about 0.04 micron, is necessary for soft settling or sedimentation in the one-package composition of the invention.

It is an important property of coatings deposited from the composition that recoating can be done at any time with any topcoat, either water-based or organic solvent-based, due to the crystalline nature of the surface of the coating, imparted by the crystalline silica. Pretreatment of the substrate surface, e.g., by sandblasting, is not needed for compositions of the invention.

Moving line applications are readily accomplished with the composition of the invention, and setting of deposited coatings can be accelerated if desired by subjecting the deposited coating to steam. Drying can be effected in about 5 minutes by this technique. Application of coatings can be carried out by brushing, spraying or flowcoating. Coating thicknesses can range from about 1.5 to about 5 mils.

As indicated in the above-mentioned AKZO publication, conventional zinc-rich coating compositions contained from about 80% to about 90% by weight zinc. In contrast to this, by substitution of crystalline silica and ferrophosphate in place of part of the zinc in conventional inorganic binder compositions, the composition of the present invention contains about 35% to about 40% by weight zinc dust and zinc flakes, thus substantially reducing the density and cost of the product while at the same time achieving excellent protection of metallic substrates against environmental attack and throw. The inorganic binder provides the good throw properties.

Ferrophosphate is an essential component, since it provides electrical conductivity when present within the broad range of about 3% to 6% by volume. Since it is not cathodic, a maximum of about 6% by volume should be observed. The density of ferrophosphate is similar to that of zinc dust, and it is a relatively low cost material, presently less than half the price of zinc dust.

Zinc flakes, which are somewhat fibrous in shape (an aspect ratio of about 11:1), have high electrical conductivity in comparison to zinc dust. The presence of zinc flakes is thus needed within the broad range of about 0.5% to about 2.5% by volume. Due to high cost a maximum of about 2.5% should be observed. For the electrically non-conductive embodiment, a maximum of about 1.0% by volume is preferred.

Crystalline silica having the low oil absorption value specified above is essential for protection against environmental attack, to provide recoatability, and to lower the density of the composition by substitution of low density silica in place of part of the zinc. Within the range of 10% to 17%, there is sufficient silica present to permit part of it to react with zinc and ethyl silicate to form a glass after application, while the remainder provides a crystalline surface which ensures recoatability.

At least two different size grades of pyrogenic amorphous silicas are needed, in order to provide soft sedimentation and to improve resistance against environmental attack. These low density silicas make the composition of the invention thixotropic, thus providing both ease of application and long term storage stability.

The presence of a wetting agent improves coatability on untreated substrates and adhesion of dried coatings.

The use of molecular sieves is preferred for improved rheological characteristics, primarily soft sedimentation.

The amount of anhydrous alcohol solvent is restricted to a maximum of about 8% by volume, in order to maintain the total volatile organic content (VOC), including the solvent present in the alkyl silicate solution, below the amount permitted by federal regulations.

A preferred one-package coating composition capable of forming a deposited coating which, when dried, is electrically non-conductive but cathodic, comprises, in volume percent based on the total volume of the composition:

- from about 55% to about 60% of an alkyl silicate solution having a solids content of about 35% to about 45% by weight;
- about 10.5% to about 12% zinc dust of at least one different average particle size grade;
- about 0.8% to about 1.0% zinc flakes having an average width of about 0.9 micron and an average length of about 10 microns;
- about 5% to about 6% particulate ferrophosphate;
- about 10% to about 17% of a particulate crystalline silica having an oil absorption value of less than 20 measured by ASTM Test D281-84;
- about 1% to about 2.5% of at least two different size grades of pyrogenic amorphous silicas having average particle sizes ranging from about 0.007 to about 0.04 micron;
- about 0.3% to about 0.5% of a wetting agent; and
- about 7% to about 8% of an anhydrous alcohol solvent.

A more preferred embodiment of the composition set forth above comprises about 60% of the alkyl silicate solution; about 5.4% zinc dust having an average particle size of about 4 microns; about 5.4% zinc dust having an average particle size of about 6 microns; about 0.9% zinc flakes; about 5.3% ferrophosphate; about 13.5% crystalline silica; about 0.5% pyrogenic amorphous silica having an average particle size of about 0.007 micron; about 0.5% of a pyrogenic amorphous silica having an average particle size of about 0.008 micron; about 0.5% of a pyrogenic amorphous silica having an average particle size of about 0.018 micron, about 0.5% of the wetting agent; and about 7.5% of anhydrous n-butanol as a solvent.

A preferred one-package coating composition, capable of forming a deposited coating which, when dried, is electrically conductive and cathodic, comprises, in volume percent based on the total volume of the composition:

- from about 55% to about 60% of an alkyl silicate solution having a solids content of about 35% to about 45% by weight;
- about 10% to about 10.5% zinc dust of at least one different particle size grade;
- about 1.5% to about 2.0% zinc flakes having an average width of about 0.9 micron and an average length of about 10 microns;
- about 5% to about 6% particulate ferrophosphate;
- about 10% to about 17% of a particulate crystalline silica having an oil absorption value of less than 20 measured by ASTM Test D281-84;
- about 1% to about 2.5% of at least two different size grades of pyrogenic amorphous silicas having average particle sizes ranging from about 0.007 to about 0.04 micron;
- about 0.3% to about 0.5% of a wetting agent; and
- about 7% to about 8% of an anhydrous alcohol solvent.

A more preferred embodiment of the above composition comprises about 60% alkyl silicate solution; about 5.0% zinc dust having an average particle size of about 4 microns; about 5.0% zinc dust having an average particle size of about 6 microns; about 1.7% zinc flakes; about 5.5% ferrophosphate, about 13.5% crystalline silica; about 0.5% of a pyrogenic amorphous silica having an average particle size of about 0.007 micron; about 0 5% of a pyrogenic amorphous silica having an average particle size of about 0.008 micron; about 0.5% of a pyrogenic amorphous silica having an average particle size of about 0.018 micron; about 0.3% of the wetting agent; and about 7.5% of anhydrous n-butanol as a solvent.

A substantially anhydrous ethyl silicate solution in ethanol containing about 40% by weight solids, which is suitable for use in the present invention, is sold by AKZO N.V. under the trademark "SILBOND". A one package moisture-cured grade designated as "SILBOND" H-12A is preferred.

Zinc dust having average particle sizes of about 4 microns and of about 6 microns is available from Purity Zinc Co. Flake zinc having an average particle size of about 0.9 micron is sold by Novamet Corp.

Ferrophosphate having an average particle size of about 10 microns, suitable for use in this invention, is available from Occidental Petroleum Corp.

Crystalline silica having an oil absorption of less than 20 measured by ASTM Test D281-84 is produced by Malvern Minerals Inc. under the trademark "NOVACITE". A silane treated silica is sold by this company under the trademark "NOVAKUP". Both types can be used in the present composition. The average particle size range of such silica should be about 2 to about 4 microns.

Pyrogenic amorphous silicas may be produced by high temperature hydrolysis of silicon tetrachloride or by transformation of silica in an electric arc. At least about 1% by volume of at least two different size grades of such silicas, having average particle sizes ranging from about 0.007 to about 0.04 micron, is necessary in the present invention to provide soft settling, and to impart resistance against moisture and saltspray vapor. Preferred pyrogenic amorphous silicas include those sold under the trademark "AEROSIL" by Degussa, and under the trademark "CABOSIL" by Cabot Corporation. "AEROSIL" 300 has an average particle size of about 0.007 micron. "AEROSIL" 972 is silane treated and has an average particle size of about 0.018 micron, while AEROSIL 974 has an average particle size of about 0.008 micron.

A suitable nonionic wetting agent is sold by BYK Chemie under the trademark "ANTI-TERRA 204".

Zeolite molecular sieves are preferably present in composition of the invention in amounts up to about 0.3% by volume in order to contribute to soft settling. Available commercial sources include Union Carbide Corporation.

The following non-limiting examples embody respective electrically non-conductive (Example 1) and electrically conductive (Example 2) compositions of the invention.

EXAMPLE 1

A one-package primer was prepared by mixing the components in a conventional paint mill, the quantities being in percent by volume based on the total volume:

|   | Ethyl silicate solution[1] (40% by weight solids) | 60.0% |
|---|---|---|
|   | Zinc dust (4 microns)[2] | 5.4 |
|   | Zinc dust (6 microns)[3] | 5.4 |
|   | Zinc flakes (0.9 × 10 microns)[4] | 0.9 |
|   | Ferrophosphate (10 microns)[5] | 5.3 |
|   | Crystalline silica (2 microns)[6] | 13.5 |
|   | Amorphous silica (0.007 micron)[7] | 0.5 |
|   | Amorphous silica (0.008 micron)[8] | 0.5 |
|   | Amorphous silica (0.018 micron)[9] | 0.5 |
|   | Wetting agent[10] | 0.5 |
|   | Anhydrous n-butanol | 7.5 |
|   |   | 100.0% |
| 1 | AKZO N.V. "Silbond" H-12A | |
| 2 | Purity Zinc grade #4 | |
| 3 | Purity Zinc grade #6 | |
| 4 | Novamet Corp. | |
| 5 | Occidental Petroleum grade #31 | |
| 6 | Malvern Minerals "NOVACITE" 1250 | |
| 7 | Degussa "AEROSIL" 300 amorphous silica | |
| 8 | Degussa "AEROSIL" 974 amorphous silica | |
| 9 | Degussa "AEROSIL" 972 silane treated amorphous silica | |
| 10 | BYK Chemie "ANTI-TERRA 204" nonionic | |

EXAMPLE 2

A one-package primer was prepared in the same manner as in Example 1, with amounts again in percent by volume based on total volume:

|   | Ethyl silicate solution[1] (40% by weight solids) | 60.0% |
|---|---|---|
|   | Zinc dust (4 microns)[2] | 5.0 |
|   | Zinc dust (6 microns)[3] | 5.0 |
|   | Zinc flakes (0.9 × 10 microns)[4] | 1.7 |
|   | Ferrophosphate (10 microns)[5] | 5.5 |
|   | Crystalline silica (2 microns)[6] | 13.5 |
|   | Amorphous silica (0.007 micron)[7] | 0.5 |
|   | Amorphous silica (0.008 micron)[8] | 0.5 |
|   | Amorphous silica (0.018 micron)[9] | 0.5 |
|   | Wetting agent[10] | 0.3 |
|   | Anhydrous n-butanol | 7.5 |
|   |   | 100.0% |
| 1 | AKZO N.V. H-"Silbond" 12A | |
| 2 | Purity Zinc grade #4 | |
| 3 | Purity Zinc grade #6 | |
| 4 | Novamet Corp. | |
| 5 | Occidental Petroleum grade #31 | |
| 6 | Malvern Minerals "NOVAKUP" 337 silane treated | |
| 7 | Degussa "AEROSIL" 300 amorphous silica | |
| 8 | Degussa "AEROSIL" 974 amorphous silica | |
| 9 | Degussa "AEROSIL" 972 silane treated amorphous silica | |
| 10 | BYK Chemie "ANTI-TERRA 204" nonionic | |

Tests have been conducted comparing coatings deposited from the composition of the present invention with coatings deposited from an organic binder composition of the type disclosed in U.S. Pat. No. 5,098,938 (acknowledged above), and with coatings deposited from a conventional inorganic binder composition containing about 85% by weight zinc dust and conventional extenders and suspension agents. Dried coating thicknesses ranged from about 2 to 3 mils.

The composition of the invention and coatings deposited therefrom had the following properties:

The composition was thixotropic and non-settling;
Application was easily effected by brushing, spraying and flowcoating.
Solvent resistance was excellent.
Resistance against saltspray corrosion was about equal to the prior art coatings.
The throw was excellent; cathodic protection extended over an uncoated area of about 1 inch (2.5 cm) in diameter.
Adhesion to degreased but otherwise untreated steel panels was excellent.
Coatings were resistant to temperatures up to about 370° C. (700° F.).
Recoatability with both water-based and organic solvent-based topcoats was excellent.

In summary, the disadvantages of prior art inorganic binder primers and organic binder primers are avoided by the composition of this invention.

I claim:

1. A one-package coating composition for the protection of metallic substrates against environmental attack comprising, in volume percent based on the total volume of the composition:

from about 55% to about 60% of an alkyl silicate solution having a solids content of about 35% to about 45% by weight;;
about 10% to about 14% zinc dust of at least one different average particle size grade;
about 0.5% to about 2.5% zinc flakes;
about 3% to about 6% particulate ferrophosphate;
about 10% to about 17% of a particulate crystalline silica having an oil absorption value of less than 20 measured by ASTM Test D 281-84;
about 1% to about 2.5% of at least two different size grades of pyrogenic amorphous silicas having average particle sizes ranging from about 0.007 to about 0.04 micron;
about 0.3% to about 0.5% of a wetting agent; and
about 7% to about 8% of an anhydrous alcohol solvent.

2. The composition of claim 1, comprising, in volume percent based on the total volume of the composition:

from about 55% to about 60% of an ethyl silicate solution in substantially anhydrous ethyl alcohol having a solids content of about 40% by weight;
equal volumes, totaling about 10% to about 12%, of two different particle size grades of zinc dust having an average particle size of about 4 microns and an average particle size of about 6 microns, respectively;

about 0.8% to about 2.0% zinc flakes having an average width of about 0.9 micron and an average length of about 10 microns;

about 5% to about 6% particulate ferrophosphate having an average particle size of about 10 microns;

about 11% to about 15% crystalline silica having an oil absorption value of less than 20 measured by ASTM Test D281-84, and an average particle size of about 2 microns;

about 1% to about 2% in total of three different size grades of pyrogenic amorphous silicas having average particle sizes of about 0.007 micron, about 0.008 micron and about 0.018 micron, respectively;

about 0.3% to about 0.5% of a nonionic wetting agent; and about 7% to about 8% anhydrous n-butanol as a solvent.

3. The composition of claim 1, wherein said alkyl silicate solution is ethyl silicate in substantially anhydrous ethyl alcohol as a solvent.

4. The composition of claim 1, wherein said zinc dust comprises equal volumes of an average particle size grade of about 4 microns and an average particle size grade of about 6 microns.

5. The composition of claim 1, wherein said zinc flakes have an average width of about 0.9 micron and an average length of about 10 microns.

6. The composition of claim 1, wherein said ferrophosphate has an average particle size of about 10 microns.

7. The composition of claim 1, wherein said crystalline silica has an average particle size of about 2 microns and is silane-treated.

8. The composition of claim 1, wherein said pyrogenic amorphous silicas comprise equal volumes of three different size grades.

9. The composition of claim 1, wherein said anhydrous alcohol solvent is n-butanol.

10. The composition of claim 1, including up to about 0.3% zeolite molecular sieves.

11. A one-package coating composition for the protection of metallic substrates against environmental attack, capable of forming a deposited coating which, when dried, is electrically non-conductive but cathodic, comprising, in volume percent based on the total volume of the composition:

from about 55% to about 60% of an alkyl silicate solution having a solids content of about 35% to about 45% by weight;

about 10.5% to about 12% zinc dust of at least one different average particle size grade;

about 0.8% to about 1.0% zinc flakes having an average width of about 0.9 micron and an average length of about 10 microns;

about 5% to about 6% particulate ferrophosphate;

about 10% to about 17% of a particulate crystalline silica having an oil absorption value of less than 20 measured by ASTM Test D281-84;

about 1% to about 2.5% of at least two different size grades of pyrogenic amorphous silicas having average particle sizes ranging from about 0.007 to about 0.04 micron;

about 0.3% to about 0.5% of a wetting agent; and about 7% to about 8% of an anhydrous alcohol solvent.

12. The composition of claim 11, comprising:
about 60% of said alkyl silicate solution;
about 5.4% zinc dust having an average particle size of about 4 microns;
about 5.4% zinc dust having an average particle size of about 6 microns;
about 0.9% of said zinc flakes;
about 5.3% of said ferrophosphate;
about 13.5% of said crystalline silica;
about 0.5% of said pyrogenic amorphous silica having an average particle size of about 0.007 micron;
about 0.5% of said pyrogenic amorphous silica having an average particle size of about 0.008 micron;
about 0.5% of said pyrogenic amorphous silica having an average particle size of about 0.018 micron;
about 0.5% of said wetting agent; and
about 7.5% of anhydrous n-butanol as said solvent.

13. A one-package coating composition for the protection of metallic substrates against environmental attack, capable of forming a deposited coating which, when dried, is electrically conductive and cathodic, comprising, in volume percent based on the total volume of the composition:

from about 55% to about 60% of an alkyl silicate solution having a solids content of about 35% to about 45% by weight;

about 10% to about 10.5% zinc dust of at least one different particle size grade;

about 1.5% to about 2.0% zinc flakes having an average width of about 0.9 micron and an average length of about 10 microns;

about 5% to about 6% particulate ferrophosphate;

about 10% to about 17% of a particulate crystalline silica having an oil absorption value of less than 20 measured by ASTM Test D281-84;

about 1% to about 2.5% of at least two different size grades of pyrogenic amorphous silicas having average particle sizes ranging from about 0.007 to about 0.04 micron;

about 0.3% to about 0.5% of a wetting agent; and about 7% to about 8% of an anhydrous alcohol solvent.

14. The composition of claim 13, comprising:
about 60% of said alkyl silicate solution;
about 5.0% zinc dust having an average particle size of about 4 microns;
about 5.0% zinc dust having an average particle size of about 6 microns;
about 1.7% of said zinc flakes;
about 5.5% of said ferrophosphate;
about 13.5% of said crystalline silica;
about 0.5% of said pyrogenic amorphous silica having an average particle size of about 0.007 micron;
about 0.5% of said pyrogenic amorphous silica having an average particle size of about 0.008 micron;
about 0.5% of said pyrogenic amorphous silica having an average particle size of about 0.018 micron;
about 0.3% of said wetting agent; and
about 7.5% of anhydrous n-butanol as said solvent.

* * * * *